United States Patent [19]

Bhattacharjee et al.

[11] Patent Number: 4,946,909

[45] Date of Patent: Aug. 7, 1990

[54] PROCESS FOR PRODUCTION OF QUASI-RANDOM COPOLYMERS FROM HOMOPOLYMERS USING ARYL PHOSPHORYL AZIDE(S)

[75] Inventors: Himangshu R. Bhattacharjee, Randolph; Yash P. Khanna, Cedar Knolls, both of N.J.

[73] Assignee: ALLIED-SIGNAL INC., Morris Township, Morris County, N.J.

[21] Appl. No.: 266,539

[22] Filed: Nov. 3, 1988

[51] Int. Cl.$^5$ .......................... C08L 77/00; C08K 5/51
[52] U.S. Cl. ..................................... 525/432; 524/147; 524/148; 524/151
[58] Field of Search ................ 525/432; 524/147, 148, 524/151

[56] References Cited

U.S. PATENT DOCUMENTS

| | | |
|---|---|---|
| 3,509,107 | 4/1970 | Brignac . |
| 3,551,548 | 12/1970 | Brignac et al. . |
| 4,390,667 | 6/1983 | Aharoni et al. . |
| 4,417,031 | 11/1983 | Aharoni et al. . |
| 4,417,032 | 11/1983 | Khanna et al. . |

FOREIGN PATENT DOCUMENTS 569184 5/1945 United Kingdom .

OTHER PUBLICATIONS

"Polymerization of Amino–Acids or Peptides with Diphenyl Phosphoryl Azide (DPPA)"-Nishi Noro et al., Int. J. Biol. Macromol., vol. 2 p. 53, 1980.
Shiori Takayuki, "Diphenylphosphoryl Azide. A New Convenient Reagent for a Modified Curtius Reaction and for the Peptide Synthesis", *J. of the American Chemical Society*, vol. 94 pp. 6203–6205 (1972).

*Primary Examiner*—Wilbert J. Briggs, Sr.
*Assistant Examiner*—Vasu S. Jagannathan
*Attorney, Agent, or Firm*—Richard C. Stewart; Gerhard H. Fuchs

[57] ABSTRACT

A process for forming random copolymers which comprises forming a polymer melt containing one or more polyamides and one or more aryl phosphoryl azide compounds, such as diphenyl phosphoryl azide; and heating said melt for a period of time sufficient to form the desired amount of the copolymer.

20 Claims, No Drawings

PROCESS FOR PRODUCTION OF QUASI-RANDOM COPOLYMERS FROM HOMOPOLYMERS USING ARYL PHOSPHORYL AZIDE(S)

BACKGROUND OF THE INVENTION

1. Field of the Invention

This invention relates to a novel process for producing copolymers using homopolymers as the starting materials. More specifically, this novel process involves reacting a mixture of two or more polyamides, especially poly(caproamide) (nylon 6) and poly(hexamethylene adipamide) (nylon 6,6) and one or more aryl phosphoryl azide compounds in order to obtain a copolymer from the reaction of the individual homopolymers. The materials obtained by this process are not strictly random or block copolymers but behave similarly to a random system and, therefore, we classify them as "quasi-random" copolymers. For simplicity, we shall refer to them as random copolymers. The random copolymers of the present invention may be fabricated into films or other products which have desirable properties, and can be useful in making injection molded or extruded products of improved properties.

2. Description of the Prior Art

U.S. Pat. No. 4,417,032 discloses a process for forming quasi-random copolymers from two or more homo polyamides. In this process, the homo polyamides are melt blended in the presence of a phosphite promoter.

U.S. Pat. No. 3,509,107 discloses a process for increasing the relative viscosity of polyamide fibers or copolyamides by incorporating a phosphorous or phosphite compound into the polyamide under an inert gas atmosphere. The primary object of U.S. Pat. No. 3,509,107 is to provide a process for increasing the viscosity of polyamide yarn and cord which requires a minimum amount of gas. U.S. Pat. No. 3,551,548 (Brignac et al., 1970) describes various optimizing procedures for U.S. Pat. No. 3,509,107. The described patents are each directed only to a method of producing polyamide yarn with increased viscosity via incorporating a phosphorous or phosphite compound into the yarn, and then heating said yarn in the presence of inert gas.

British Patent No. 569,184 discloses a method for producing a random copolymer from nylon 6 and nylon 6,6. The invention described herein teaches that heating a mixture of nylon 6 and nylon 6,6 results in interchange between various sections of the respective polymer molecules with the final product being a random copolymer of nylon 6 and nylon 6,6. In order to produce a random copolymer of nylon 6 and nylon 6,6, British Patent No. 569,184 teaches that it is necessary to heat the mixture of homopolymers for periods of time up to 8 hours at 285° C. without any catalyst.

U.S. Pat. No. 4,390,667 discloses a process for decreasing the melt index and increasing the viscosity of polyamide fibers via incorporating a phosphate compound into the polyamide and heating the polylamide until the desired changes in the melt index and viscosity occur. The phosphate utilized in U.S. Pat. No. 4,390,667 include substituted aryl phosphates which satisfy certain Hammett sigma values.

U.S. Pat. No. 4,417,031 discloses a process for preparing block and graft copolymers. The described process involves reacting two or more polyamides, polyesters, and homopolymers of β-unsaturated carboxylic acids in order to form a graft and/or block copolymer. Included in the patent are copolymers formed from poly(caproamide) and poly(hexamethylene adipamide).

Diphenyl phosphoryl azide has been used as a convenient reagent for racemization-free peptide synthesis and for polymerization of peptides such as β-alamino and L-alanylglycine. See for example, Nishi, Noro et al. "Polymerization of Amino-acids or Peptides with Diphenyl Phosphoryl Azide (DPPA)", Int. J. Biol. Macromol., Vol. 2, p. 53 (1980) and Shiori, Takayuki, "Diphenylphosphoryl Azide. A New Convenient Reagent for a Modified Curtius Reaction and for the Peptide Synthesis", J. of the American Chemical Society, Vol. 94, p. 6203–6205 (1972).

BRIEF DESCRIPTION OF THE INVENTION

In accordance with this invention, there is provided a process for forming random copolymers which comprises the steps of:

(A) forming an intimate mixture of two or more polyamides and an effective amount of one or more aryl phosphoryl azide compounds of the formula:

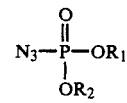

wherein:
$R_1$ is selected from the group consisting of phenyl or phenyl substituted with one or more substituents such as alkyl, alkylphenyl, alkoxyalkyl, alkoxy, nitro, halo, phenyl, phenoxy, phenylalkyl, sulfite and the like, which are inert under the process conditions; and $R_2$ is selected from the group consisting of $R_1$ substituents, alkyl, haloalkyl, hydrogen, and metal and non-metal cations; and (B) heating said mixture for a period of time sufficient to produce the desired amount of the desired random copolymer.

The formation of the random copolymer will be accompanied by a decrease in the temperature of the "melting transition of the homopolymers forming the random copolymer and an increase in the size of the melting transition" for the copolymer as the random polymerization progresses as shown by differential scanning calorimetry, culminating in the presence of a "predominating single melt transition" for the copolymer. As used herein, "a melting transition" is temperature zone which covers the whole melting process, e.g. beginning to the end; and as used herein "predominantly a single melting transition" means that the polymer melt exhibits a single major melting transition when analyzed by differential scanning calorimetry which may be accompanied by one or more minor shoulders.

DESCRIPTION OF THE PREFERRED EMBODIMENTS

The process of this invention includes two essential steps. The first step of the process consists of forming an intimate mixture of two or more appropriate polymers as described above and one or more phosphoryl azide compounds. In the second step of the process, the intimate mixture is heated at a temperature and for a time sufficient to form the desired copolymers. The formation of such copolymer is indicated by a polymeric material having predominantly a single melting transition or a polymeric material having a single melting transition when analyzed by DSC.

In a preferred embodiment of this invention, a molten mixture is formed in the first process step. As used herein, "molten mixture" is an intimate mixture which has been heated to a temperature which is equal to or greater than the melting point of at least one of the polymer components of the mixture. The manner in which the molten mixture is formed is not critical and conventional methods can be employed. For example, the molten mixture can be formed through use of conventional polymer and additive blending means, in which the polymeric components are heated to a temperature equal to or greater than the melting point of at least one of the polymers, and below the degradation temperature of each of the polymers. In a particularly preferred embodiment of this invention, the polymers are heated above the melting point of each of the polymers in the mixture. An effective amount of one or more aryl phosphoryl azide compounds (in a liquid or powdered form, either neat or in dilute form) is added to the melted polymers while at the same time vigorously stirring the melt, or added prior to melting and mixing. Heating is continued until the desired copolymer is formed as indicated by the formation of a polymeric material having a predominantly single melting transition or a polymeric material having a single melting transition.

In the most preferred embodiments of the invention, the components of the intimate mixture can be granulated, and the granulated components mixed with a suitable aryl phosphoryl azide compound in liquid form or in solution a suitable mixer, as for example, a tumbler or a Branbury Mixer, or the like, as uniformly as possible. Thereafter, the composition is dried in vaccum and heated in an extruder until the polymer components are melted. As described above, the mixture is heated in the extruder until the polymeric components react to form a random copolymer. The formation of a random copolymer is evidenced by a single melting point when the extruded polymeric material is analyzed by differential scanning calorimetry. It will be appreciated that the mixing and heating of the blend of homopolymers and aryl phosphoryl azide compound be accomplished by other conventional methods known to those skilled in the art.

The order of mixing of the various components of the intimate mixture is not critical. Accordingly, the order of addition of the polymers, the aryl phosphoryl azide compound and other optional components to be described in more detail hereinbelow, to form the intimate mixture, can be varied as desired.

The process can be carried out in the presence of air or other gases. The process of this invention is preferably carried out in the absence of air, as for example, in the presence of an inert gas, such as argon, carbon dioxide, nitrogen or the like.

The process of this invention can be conducted in a batch, semicontinuous or continuous fashion. The reactants and reagents may be initially introduced into the reaction zone batchwise or they may be continuously or intermittently introduced in such zone during the course of the process. Means to introduce and/or just the quantity of reactants introduced, either intermittently or continuously into the reaction zone during the course of the reaction can be conveniently utilized in the process especially to maintain the desired weight ratio of the polyamide, arylphosphoryl azide compound and other optional additives. The reaction can be conducted in a single reaction zone or in a plurality of reaction zones, in series or in parallel or it may be conducted intermittently or continuously in an elongated tubular zone or series of such zones. The materials of construction employed should be inert to the reactants during the reaction and the fabrication of the equipment should be able to withstand the reaction temperatures and pressure. The reaction zone can be fitted with one or more internal and/or external heat exchanger(s) in order to control undue temperature fluctuations, or to prevent any possible "runaway" reaction temperatures.

Reaction temperatures can be varied over a wide range. However, it should be appreciated that the process temperature employed in any specific instance will depend on the particular polymer or polymers employed and, in the preferred embodiments should be at least as high as the melting point of the polymers and below the degradation temperature of the polymers. In the preferred embodiments of this invention, the process temperature is such that the polymer will remain in the molten state as the random copolymers are formed. Normally, this can be accomplished in one or two ways. Either the process can be carried out at a temperature which is equal to or greater than the melting point of the desired product; or process temperatures can be increased periodically over the course of the conduct of the process so as to maintain the mixture in the molten state.

In the preferred embodiments of this invention in which the homopolymers are polycaprolactam and poly(hexamethylene adipamide), the reaction temperature of the present invention can vary over a range between about 245° C. and about 315° C. Preferably, the reaction temperature should be maintained between about 245° C. and about 305° C., and most preferably the process should be carried out at a temperature of from about 295° C. to about 300° C. It will be appreciated that this invention and further experiments in regard to this invention have been conducted on a small laboratory scale. Therefore, it should be appreciated that if the invention were conducted on a larger industrial scale that some heat loss might occur. Consequently, an industrial practice of the present invention would possibly require that the extrusion vessel be heated to a temperature greater than about 295° C. to about 310° C. in order to obtain a reaction temperature of from about 295° C. to about 300° C.

Similarly, process pressures are not critical and can be varied widely without adversely affecting the process. Consequently, the process can be conducted at sub-atmospheric, atmospheric or super-atmospheric pressures. However, for convenience the process is carried out at atmospheric or autogeneous pressure.

The process is carried out for a time sufficient to form the desired random copolymer as indicated by formation of a single melting peak (DSC) for the copolymer product. Reaction times can be varied over a wide range. Usually, reaction times will depend on a variety of factors such as the polymeric components, reaction temperatures, the aryl phosphoryl azide compound, and its concentration, and other factors know to those of skill in the art to affect reaction times. In most instances, the reaction time can vary from a few seconds to 24 hours or more. In the preferred embodiments of this invention, reaction times will vary from about 1 min. to about 2 hrs. and in the particularly preferred embodiments from about 2 mins. to about 30 to 60 mins.

Best results are obtained when the process of this invention is carried out in the presence of as little water as possible. Ideally, the conditions will be anhydrous, and this represents the most preferred embodiment of the invention. However, good results can be obtained when as much as 0.165 weight percent water based on the total weight of the mixture is present therein. In the preferred embodiments, the weight percent of water is less than about 0.1 weight percent, and in the particularly preferred embodiments, the weight percent of water is less than about 0.05 weight percent on the same basis.

Aryl phosphoryl azide compounds for use in the practice of this invention are of the formula:

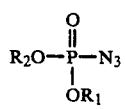

wherein $R_1$ and $R_2$ are as described above. Illustrative of useful compounds are those in which $R_1$ is an aryl substituent such as phenyl or substituted phenyl such as 2-aminophenyl, 3-aminophenyl, 2-benzyloxyphenyl, 3-benzyloxyphenyl, 4-benzyloxyphenyl, 2-bromophenyl, 3-bromo-5-chlorophenyl, 3-bromo-2,4-dimetrophenyl, 5-bromo-2-nitrophenyl, 2-butoxyphenyl, 3-chlorophenyl, 4-chloro-2,3-di-nitrophenyl, 2,4-dibromophenyl, 2,6-dichlorophenyl, 2,4-diiodophenyl, 3,5-dimethoxyphenyl, 2-ethoxyphenyl, 4-ethoxyphenyl, 2,5-dinitrophenyl, 4-heptyloxyphenyl, 4-hexyloxyphenyl, 4-methyoxyphenyl, 4-methoxy-2-nitrophenyl, 4-octyloxy phenyl, 4-propoxyphenyl, 2,3,5-trichlorophenyl, 2,3,5-triiodophenyl, 4-isobutylphenyl, 4-isopropyl-1-methylphenyl, 2-methoxy-4-propenylphenyl, 4-methyl-1,3,5-chlorophenyl, 4-pentylphenyl, 2-propylphenyl, 2,3,5,6-tetramethylphenyl, 3,5-di-tert-butylphenyl, 4-tert-butylphenyl, 3-isopropylphenyl, 2,4-dimethylphenyl, 2-methylcarbonyl phenyl and the like. The $R_2$ substituents can vary widely and include $R_1$ substituents, alkyl and substituted alkyl groups such as tert-butyl, n-butyl, isopropyl, hexyl, 2-nitropropyl, neopentyl, pentyl, sec-pentyl, ethyl, 2-chloroethyl and the like. Metal salts of the phosphoryl azide such as sodium, potassium, zinc, lithium, calcium, barium, magnesium, aluminum, lanthanium and other metal salts and/or ammonium phosphoryl azide compounds in which $R_2$ is a cation are also illustrative of useful compounds.

Preferred for use in the practice of this invention are phosphoryl azide compounds in which $R_1$ and $R_2$ are the same or different and are phenyl or substituted phenyl. In the particularly preferred embodiments of the invention, $R_1$ and $R_2$ are the same or different and are phenyl or phenyl substituted with one or more nitro, alkoxyalkyl, alkylphenyl, phenoxy, halo, phenyl, phenylalkyl, alkyl or alkoxy groups. Amongst these particularly preferred embodiments, most preferred are those embodiments in which $R_1$ and $R_2$ are the same and are phenyl, phenyl substituted with one or more alkyl, phenyl, phenylalkyl or alkoxy groups, with diphenyl phosphoryl azide being the phosphoryl azide compound of choice.

An effective amount of one or more aryl phosphoryl azide is employed in forming the intimate mixture. As used herein, "an effective amount" is an amount of the aryl phosphoryl azide which when added to the polymeric component in accordance with this invention forms a mixture which when heated forms the desired random copolymers to any extent. In general, the amount of phosphoryl azide employed will vary depending on the polyamides use. Usually, the amount of phosphoryl azide employed is at least about 0.10 weight percent. In the preferred embodiments of this invention, the quantity of the one or more phosphoryl azide employed is at least about 0.10 weight percent to about 10 weight percent, based on the total weight of the mixture. In the particularly preferred embodiments of this invention, the weight percent of phosphoryl azide is in the range of from 0.20 to about 5.0 weight percent, and amongst these particularly preferred embodiments, those in which the quantity of phosphoryl azide employed is from about 0.2 to about 2.0 weight percent based on the total weight of the mixture are most preferred with from about 0.5 to about 1.0 being the quantity of choice.

Polymers which are useful in the conduct of this invention are polyamides. The physical blend of two or more polyamides and one or more aryl phosphoryl azide compounds described above produces a random copolymer when the blend is processed in accordance with this invention. While we do not wish to be bound by any theory, it is believed that to a varying extent, the copolymer results from a cleavage of the polyamides into their monomeric units, and a recombination of these moieties in a somewhat random fashion to yield the desired random copolymer. For example, in the case of poly(hexamethylene adipamide) and polycaproamide, the random copolymer results from the cleavage of poly(hexamethylene adipamide) into 1,6-diaminohexane moieties [—NH—$(CH_2)_6$—NH—] and adipoyl moieties [—OC—$(CH_{24}$—CO—] and the cleavage of poly(caproamide) into aminocaproyl moieties [HN—$(CH_2)_6$—CO—] with three moieties of the two homopolymers recombining in a somewhat random fashion to yield a random copolymer.

The melting point of pure poly(caproamide) is about 222° C. and the melting point of pure poly(hexamethylene adipamide) is about 261° C. The random copolymer of these materials has a single depressed melting point with respect to the homopolymers. For example, an 80/20 blend of nylon 6/nylon 6,6 yields a single melting point of about 211° C. The depressed melting points are probably due to the defects in the crystals (lower crystallite thickness) of the major component caused by the minor component.

Illustrative of useful polyamides are those characterized by the presence of recurring carbonamide groups as an integral part of the polymer chain which are separated from one another by at least two carbon atoms. These polyamides are those prepared by reaction of diamines and diacids having the recurring unit represented by the general formula:

in which R is an alkylene group of at least about two carbon atoms, preferably from about 2 to about 10 carbon atoms, and $R^1$ is R or aryl. Exemplary of such materials are poly(hexamethylene adipamide) (nylon 6,6) poly(hexamethylene sebacamide) (nylon 6,10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9), poly(decamethylene azelamide) (nylon 10,9), poly(decamethylene sebacamide) (nylon 10,10), poly[bis(-

4aminocyclohexyl)methane-1,10-decanecarboxamide)] (Quiana), poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminoocatanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use in the practice of this invention are polycaprolactam and poly(hexamethylene adipamide).

Various other optional ingredients, which are normally included in polymer compositions, may be added to the mixture at an appropriate time during the conduct of the process. For example, these optional ingredients can be added either prior to or after melting of the polymers in the first step of the process of this invention; or after the conduct of the second step in which the desired random copolymers have been formed. Such optional components include fillers, plasticizers, impace modifiers, colorants, mold release satisfy agents, antioxidants, ultraviolet light stabilizers, lubricants, antistatic agents, fire retardants, and the like. These optional components are well known to those of skill in the art, accordingly, only the preferred optional components will be described herein in detail.

The random copolymers prepared in the process of this invention preferably includes a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and mixtures thereof. Examples of such useful fillers include glass fibers alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like such fillers are well known materials and are readily available. The foregoing recited fillers are illustrative only and are not meant to limit the scope of the fillers that can be employed in this invention. In the preferred embodiments of this invention fibrous materials are the fillers of choice, and glass fiber is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer and phosphite components, and in the particularly preferred embodiment is in the range of from about 0.30 to about 90 weight percent on the same basis.

It is also very desirable to include a plasticizer of the type known in the art for use with polymer composition. Useful plasticizers will depend on various factors including the type of polymers employed, and include caprolactam, mixtures of ortho and paratoluene ethyl sulfonamides, and the like.

Random copolymers formed in accordance with this invention are useful in the fabrication of films. Films produced in accordance with this invention may be employed as packaging materials, incorporated in laminates and diffusion barrier, cooking bags, cable insulation and the like.

Such polymers are extremely useful as tire cord in pneumatic tires, and the products, filaments, fibers and yarn produced therewith have significantly better properties than other polymers. For example, the fibers have increased tenacity, greater breaking strength and greater resistance to depolymerization. When yarn produced from a random copolymer prepared by the process of this invention is made into tire cord and the cord is then used for pneumatic tire reinforcement, the life span of the tire is markedly increased over that of tires reinforced with cord made from other polymers. They are thermoplastic materials from which molded articles of manufacture having valuable properties can be produced by the conventional shaping processes, such as casting, injection molding and extruding. Examples of such moldings are components for technical equipment, apparatus castings, household equipment, sports equipments, components for the electrical and electronics industries and electrically insulations, car components, circuits, fibers and semifinished products which can be shaped by machining. The use of the materials for coating articles by means of immersion or powder coating processes is also possible as is their use as hot-melt adhesives. The polymer compositions according to the invention are outstandingly suitable for specific applications of all types since their spectrum of properties can be modified in the desired direction in manifold ways.

Compositions prepared in accordance with the process of this invention are outstandingly suitable for the production of sheets and panels having valuable properties. The sheets and panels prepared from such compositions are suitable as coating materials for other materials comprising, for example, wood, glass, ceramic, metal or other plastics, and outstanding strengths can be achieved using conventional adhesion promoters, as for example, promoters based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, as for example, by lacquering or by the application of protective films. The compositions prepared in accordance with the process of this invention can be made into films with or without fillers, which may be transparent or translucent.

The foregoing detailed description of the invention has been given for clarity of understanding only, and no unnecessary limitations are to be understood therefrom. The invention is not limited to the exact details herein shown and described, and will encompass obvious modifications which will occur to those skilled in the art in view of the appended claims.

EXAMPLE I

(A) Sample Preparation

Commercial grade nylon 6 (8207F from Allied-Signal, Inc.) and nylon 66 (Zytel 101L from DuPont) were freeze ground to an average particle size of less than about 2 mm in a conventional grinding mill and mixed to give a mixture containing 85% by weight of nylon 6 and 15% by weight of nylon 66. The mixture was vaccum dried at 95° C. Several samples of the mixture were coated with from 0.5 to 2% by weight of diphenyl phosphoryl azide (DPPA) through a solution coating method. The coated granular polymer samples were dried and extruded. The extrusion was carried out on an 1 inch single screw extrudes, with fluted mixing sections and a die zone temperature of 280° C. The extruded strand was quenched in a water bath and subsequently pelletized and subject to thermal analysis.

(B) Thermal Analysis

The melting points of the extruded samples and a control sample of nylon 6 (85)/nylon 6 (15) which did not contain DPPA were determined by differential scanning calorimetry. In these experiments, a Dupont 9900 Differential Scanning Calorimetery (DSC) was used in argon atmosphere. A sample of about 10 mg was crimped in an aluminum pan and heated at a rate of 10° C./min. After the initial heating to 280° C. (5 min. hold), the samples were cooled and reheated under the same conditions. The results of the experiments are set forth in the following Table I.

TABLE I

| Polymer | Wt % DPPA | Melting Point Initial Heat-up Tm, °C. | Reheat Tm, °C. |
|---|---|---|---|
| Nylon 6 (85)/nylon 66 (15) | 0 | 224 + 260 | 219 + 252 |
| Nylon 6 (85)/nylon 66 (15) | 0.5 | 223 + 257 | 217 + 240* |
| Nylon 6 (85)/nylon 66 (15) | 1 | 220 + 252 | 215 |
| Nylon 6 (85)/nylon 66 (15) | 2 | 217 + 241 | 211 |

*only a shoulder

The results clearly show that the melting points of the nylon 6 and nylon 66 become lower and closer to each other when DPPA is added. Upon further heat treatment (e.g. reheat in DSC) only the DPPA containing compositions exhibit a single but lower temperature melting transition, indicative of a random copolymer.

What is claimed is:

1. A process for forming random copolymers which comprises the steps of:
    A. forming an intimate mixture of two or more polyamides and one or more aryl phosphoryl azide compound in an amount sufficient to promote formation of said random copolymers, said azide compound of the formula:

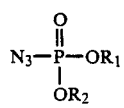

wherein:
  $R_1$ is selected from the group consisting of phenyl or phenyl substituted with one or more substituents which are inert under the process conditions; and
  $R_2$ is selected from the group consisting of $R_1$ substituents, alkyl, haloalkyl, hydrogen, and metal and non-metal cations; and
    B. heating said mixture for a period of time sufficient to produce the desired amount of random copolymer.

2. A process according to claim 1 wherein said mixture is a molten mixture.

3. A process according to claim 2 wherein at least one of said polyamides is polycaprolactam or polyhexamethylene adipamide.

4. A process according to claim 3 wherein said mixture comprises two polyamides, one of said polyamides being polycaprolactam and one of said polyamides being polyhexamethylene adipamide.

5. A process according to claim 4 wherein said mixture is heated at a temperature of from 245° C. to about 315° C.

6. A process according to claim 5 wherein said heating step is conducted in two stages, the first of which is at a temperature from about 245° C. to about 315° C., and the second of which is at a temperature of from about 240° C. and about 315° C.

7. A process according to claim 6 wherein said first and second stages are conducted at temperatures from about 265° C. to about 305° C.

8. A process according to claim 1 wherein said polymer is heated for a period of time of from about 2 to about 20 minutes.

9. A process according to claim 8 wherein said period of time is from about 2 to about 10 minutes.

10. A process according to claim 1 wherein $R_1$ and $R_2$ are the same or different and are phenyl or substituted phenyl.

11. A process according to claim 10 wherein $R_1$ and $R_2$ are the same or different and are phenyl or phenyl substituted with one or more alkyl, halo, nitro, phenyl, phenoxy, alkylphenyl, alkoxyalkyl, phenylalkyl or alkoxy groups.

12. A process according to claim 11 wherein $R_1$ and $R_2$ are the same or different and are phenyl or phenyl substituted with one or more phenyl, alkyl, alkoxy or phenylalkyl groups.

13. A process according to claim 12 wherein $R_1$ and $R_2$ are the same or different and are phenyl or phenyl substituted with one or more alkyl or alkoxy groups.

14. A process according to claim 1 wherein said aryl phosphoryl azide compound is diphenyl phosphoryl azide.

15. A process according to claim 1 wherein said mixture is heated in the absence or substantial absence of water.

16. A process according to claim 1 wherein the amount of said phosphoryl azide compound is at least about 0.10 weight percent based on the total weight of the mixture.

17. A process according to claim 16 wherein said amount is from about 0.10 to about 10 weight percent.

18. A process according to claim 17 wherein said amount is from about 0.20 to about 5.0 weight percent.

19. A process according to claim 18 wherein said amount is from about 0.2 to about 2.0 weight percent.

20. A process according to claim 19 wherein said amount is from about 0.5 to about 1.0 weight percent.

* * * * *